Figure 1:
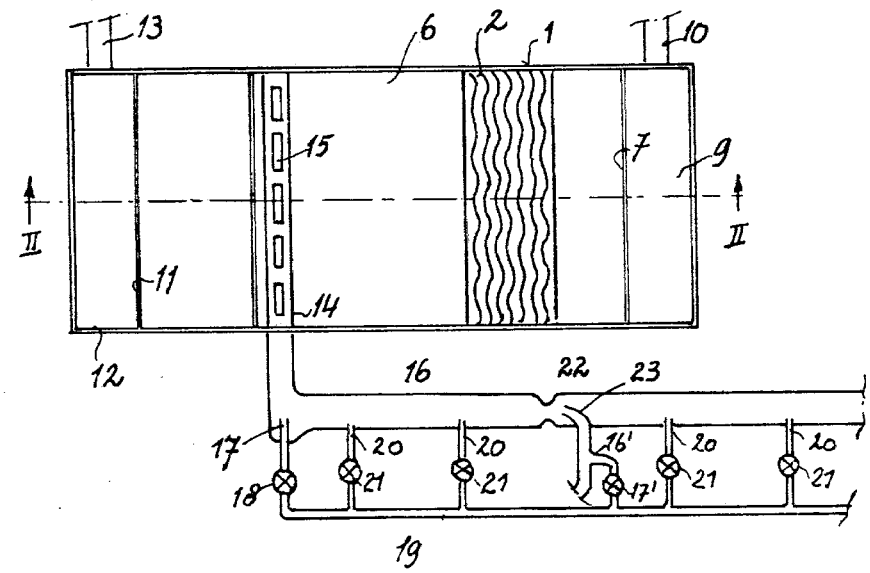

United States Patent [19]

Pielkenrood

[11] 4,344,845

[45] Aug. 17, 1982

[54] METHOD AND A DEVICE FOR MAKING FLOTABLE PARTICLES SUSPENDED IN A LIQUID BY MEANS OF GAS BUBBLES

[75] Inventor: Jacob Pielkenrood, Krommenie, Netherlands

[73] Assignee: Pielkenrood-Vinitex B.V., Netherlands

[21] Appl. No.: 218,645

[22] Filed: Dec. 22, 1980

Related U.S. Application Data

[63] Continuation of Ser. No. 52,748, Jun. 28, 1979, abandoned.

[30] Foreign Application Priority Data

Jun. 30, 1980 [NL] Netherlands .......................... 7807081

[51] Int. Cl.³ .......................... B03D 1/24; B01F 3/04
[52] U.S. Cl. .................................. 210/199; 210/221.2
[58] Field of Search ............... 210/608, 703, 704, 705, 210/706, 707, 199, 220, 221.1, 221.2; 261/76, 42, 77, 21, 124, DIG. 75

[56] References Cited

U.S. PATENT DOCUMENTS

| 2,242,139 | 5/1941 | Munrue | 210/705 |
| 2,446,655 | 8/1948 | Lawrason | 210/705 |
| 3,179,252 | 4/1965 | Vrablik | 210/705 |
| 3,314,880 | 4/1967 | Rubin | 210/705 |
| 3,809,240 | 5/1974 | Savall | 210/221.2 |
| 3,826,742 | 7/1974 | Kirk | 261/DIG. 75 |
| 3,969,245 | 7/1976 | Ramirez | 210/707 |
| 4,160,737 | 7/1979 | Pielkenrood | 210/221.2 |
| 4,162,972 | 7/1979 | Green | 210/221.2 |
| 4,173,178 | 11/1979 | Wieland | 261/76 |
| 4,190,522 | 2/1980 | Tra | 210/221.2 |

Primary Examiner—Ernest G. Therkorn
Attorney, Agent, or Firm—William E. Mouzavires

[57] ABSTRACT

A method and a device for removing suspended particles from a liquid by means of gas-bubble flotation, in which, before the gas-bubble flotation step proper, the liquid is more or less saturated with the gas in one or more preceding gas introduction steps, so as to obtain a longer average life-time of the smaller gas bubbles in the final flotation step.

3 Claims, 2 Drawing Figures 4,344,845

METHOD AND A DEVICE FOR MAKING FLOTABLE PARTICLES SUSPENDED IN A LIQUID BY MEANS OF GAS BUBBLES

This is a continuation of application Ser. No. 052,748, filed June 28, 1979, now abandoned.

The invention relates to a method and a device for making particles, which are suspended in a liquid and are to be removed therefrom, flotatable by means of gas bubbles, which particles are made lighter than the liquid by adhesion of gas bubbles. This is, in particular, favourable for suspended components having a specific weight which only slightly differs from that of the liquid, and/or when the separation thereof is considerably retarded by friction forces. Also in the case of particles which are heavier than the liquid, the separation sense can often be reversed in that manner, To that end a liquid, and generally the cleaned carrier liquid, is saturated under pressure with a gas, in particular air, and is depressurized just before being introduced into the liquid to be treated, a large number of gas bubbles then being generated, at least a part of which will attach themselves to particles suspended in the liquid. These particles then become considerably lighter than the carrier liquid, and can, therefore, be separated from the liquid by flotation.

However the gas bubble adhesion will take place more difficultly as the gas bubbles are bigger in relation to the particles to be made flotatable. Already when being generated these bubbles substantially vary in size, which variation is still increased in that these bubbles will coalesce to form larger bubbles, and, thus, a limit is set to the flotation effect of the bubbles.

It is an object of the invention to improve the flotation effect obtainable with gas bubbles, and to provide a method to that end in which into a first liquid to be treated a second liquid is introduced which, at the pressure and temperature of the first liquid, is supersaturated with a gas, which method is characterised in that the introduction of the second liquid is done in at least two successive steps, and this is such a manner that the concentration of the dissolved gas in the first liquid is increased first before, by a subsequent introduction of the second liquid, a generation of the most effective small gas bubbles is effected.

For it has appeared that the liquid to be treated is, generally, subsaturated or at best saturated with gas, in particular air, so that, when introducing gas bubbles, at first the concentration of dissolved gas in the liquid is increased until the gas pressure in the liquid more or less corresponds to that in the gas bubbles, and only then a sufficient gas bubble generation can occur. It has appeared that, when introducing the gas at once, smaller gas bubbles will be insufficiently generated, which is a consequence of this pressure difference. If, now, the gas is introduced in consecutive steps, a saturation of the liquid can be obtained to such an extent that, in a subsequent step, a sufficient number of gas bubbles suitable for flotation purposes will be obtained.

In particular this step-wise introduction of gas is obtained in a liquid which is continuously supplied to a separation device by means of a duct or pipe line by introducing the gas in this duct or pipe line in different consecutive points which are mutually separated in the liquid flow sense.

If, moreover, additional substances for promoting separation are to be added to the liquid, this can be done with a simultaneous introduction of gas, which may lead to a better effect of these substances in the liquid to be treated.

The invention relates, furthermore, to a device which is designed for executing this method.

Figure 2:
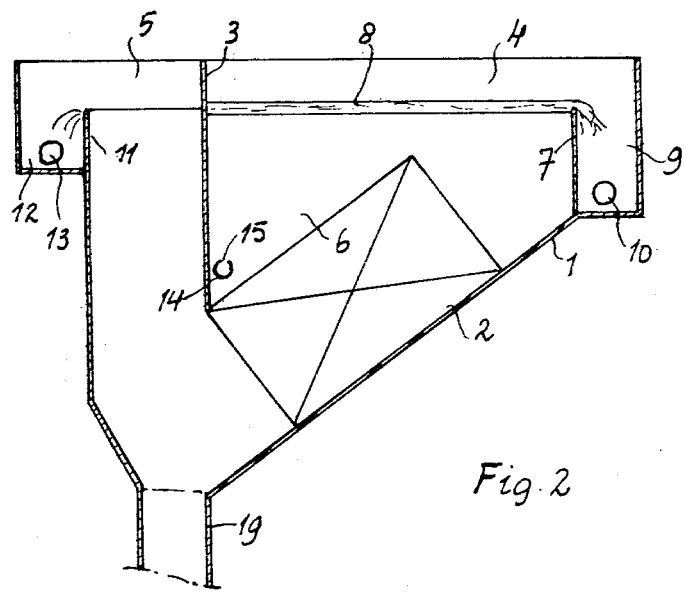

The invention will be described below by reference to a drawing, showing in:

FIG. 1 a diagrammatical plan view of an embodiment of a device according to the invention; and FIG. 2 a transverse section on line II—II of FIG. 1.

Before describing the method and the device according to the invention, the backgrounds thereof will be considered first.

The invention is based on the insight that big gas bubbles behave differently from smaller ones. The internal pressure of a gas bubble in respect of the liquid is, inter alia, dependent on the surface tension of the liquid boundary layer surrounding the gas bubble. Furthermore this pressure is of interest for the migration of the gas from the bubble into the liquid, for which, of course, the concentration of the gas dissolved in the liquid is important too. Generally speaking this pressure difference is proportional to $1/r$, if $r$ is the radius of the gas bubble under consideration. The surface area of the bubble is proportional to $r^2$ and its volume to $r^3$. The diffusion of gas towards the surrounding liquid is proportional to the pressure difference and the surface area, so that the loss of gas by diffusion related to the volume of the bubble will, in first approximation, be proportional to $(1/r).r^2/r^3 = 1/r^2$. This means that small bubbles will dissolve relatively faster than bigger ones. Moreover the collision probability between two gas bubbles and the coalescence thereof into a bigger one is at least proportional to $r^2$, which probability is, for bigger bubbles, substantially larger than for smaller ones.

A consequence thereof is that, if initially a more or less uniform distribution of the bubble sizes is present, the smaller ones will quickly disappear by dissolving, and the number of bigger ones will increase by coalescence. Moreover, as the concentration of dissolved gas in the liquid increases, the bigger bubbles will take in gas again from the liquid, in particular since a certain concentration gradient is present around such bubbles.

On the other hand small bubbles will easier adhere to suspended particles than bigger ones. Starting with a given size distribution of the bubbles and suspended particles, one might make an estimate of the adhesion probability at a given residence time. This is, however, traversed by the short life of the smaller gas bubbles, which, eventually, restricts the period suitable for attachment very considerably. Also the bubbles already attached to particles may disappear again by dissolving, and are, then, lost for the flotation effect.

The invention is, now, based on the insight that, by dividing the air bubble introduction in partial steps, the number of active air bubbles can be increased, and this because:

(1) at each renewed introduction small bubbles will be generated again, which are, partly, available for attaching themselves to suspended particles; and (2) after each introduction of gas bubbles the gas content of the liquid increases, so that successively smaller bubbles can survive in the liquid without being quickly dissolved.

It is, of course, possible to treat a quantity of liquid present in a vessel with gas bubbles at intervals, so that, then, the gasification steps mentioned above are distributed in time. However, in a continuous treatment, e.g. at the entry side of a separation device, this will be objectionable, so that, then, a stepwise introduction of gas will preferably be obtained by providing additional injection points in the supply duct or pipe line towards the separator, which points are situated at mutual distances in the flow sense.

In FIGS. 1 and 2 an embodiment of such a device is shown in a diagrammatical manner. The device shown comprises a basin 1 in which a plate separator 2 is arranged at an angle in respect of the horizontal plane. By means of a partition 3 this basin is divided into a supply chamber 4 and a discharge chamber 5, the part 6 of said supply chamber 4 above the inclined upper surface of a plate separator 2 having a triangular cross-section. At the other side of the basin 1 an overflow weir 7 is arranged, over which a floating layer 8 can flow off towards a discharge trough 9, the latter communicating with a discharge duct 10, and, if necessary, skimmers or the like may be used for moving the layer 8 towards the weir 7. The discharge chamber 5, on the other hand, is provided with an overflow weir 11 for determining the liquid level in the basin 1, followed by a discharge trough 12 and a discharge duct 13 for the treated liquid.

Near the deepest point of the space 6 a supply tube 14 is situated which is provided with continuous or interrupted outflow slots 15. Outside the basin 1 the tube 14 communicates with a supply duct 16, and a supply nozzle 17 extends into the tube 14, which nozzle is connected, by means of a relief valve 18, to a duct 19 which is connected to a pump not shown, by means of which a pressurized gas, in particular air, is supplied to the liquid. In this manner a large number of gas bubbles is generated in the liquid supplied through the duct 16 by the abrupt pressure relief of the liquid saturated with gas, which bubbles can attach themselves to the particles suspended in the liquid, and then these particles will flotate towards the floating layer 8. Subsequently the liquid flows through the separator 2, in which the remaining lighter particles and gas bubbles will be separated, and possibly present heavier particles will sedimentate there and will be collected in a funnel 19. The clean liquid flows off over the weir 11 towards the discharge duct 13.

It has now appeared that the separation effect can be very considerably improved by providing, in the duct 16, additional injection nozzles 20 and associated relief valves 21 which are connected to the pressure line 19 as well. The relief valve 18 can, accordingly, be adjusted more sparingly so as to reduce the quantity of pressurized liquid introduced by the nozzle 17 in accordance with the quantity introduced by the nozzles 20. The distance between the additional nozzles 20 is, then, chosen in such a manner that, taking into account the flow velocity of the liquid in the duct 16, there will be sufficient time for dissolving the gas in the liquid, thereby improving the gas saturation degree.

Experiments have shown that the flotation efficiency of the gas bubbles, i.e. the ratio between the amounts of gas attached to suspended particles and the total amount of supplied gas, can be substantially improved in this manner, so that even a substantially smaller amount of pressurized liquid can be used. This leads to accordingly substantial energy savings, and, moreover, the compression pump may be made smaller which will lead to corresponding cost reductions too.

In the duct 16 often a constriction 22 is present, and a supply 23 opens in said duct 16 at the upstream side thereof for introducing a flotation promoting agent, e.g. a polyelectrolyte. It has appeared that, if an additional gas injection nozzle 16' with relief valve 17' is arranged in said supply 23, a considerably better effect will be obtained. If the agent thus supplied induces a lowering of the surface tension, the overpressure in the gas bubbles will be lowered accordingly, so that the dissolution tendency of the gas bubbles is reduced. This can have an additional beneficial influence on the separation effect of the gas bubbles.

A further advantage is that the relief valve 13, which, in the existing devices, is designed for passing a relatively large amount of liquid saturation with gas, can be made substantially smaller when using the method of the invention. This too will lead to additional savings.

It will be clear that the invention is not restricted to the embodiment described above. For instance the use of a plate separator 2 is not required if, with gas bubbles alone, a sufficient flotation of the components to be removed is obtained. Furthermore the supply of additional substances can take place in other points, for instance in the basin 1 itself.

Sometimes it will be favourable to use an open trough for at least a part of the duct 16. The advantage thereof is that, then, the effect of the pressurized liquid introduced by means of the nozzles 20 is directly visible, which will simplify the adjustment of the relief valves 21.

Within the scope of the invention many other modifications are possible.

I claim:

1. In a system for separating by flotation components suspended in a carrier liquid supplied from a source of carrier liquid, the system including a chamber defining a flotation space, a first supply duct for the carrier liquid to be treated opening in an outlet at said space near the bottom thereof, a second liquid source independent of the source of carrier liquid, a second supply duct independent of the first supply duct connected to means for mixing a gas under elevated pressure with a second liquid from the second liquid source in said second supply duct so as to saturate said second liquid with said gas at said elevated pressure, a relief valve in said second duct adapted for suddenly reducing the pressure of said second liquid so as to supersaturate said second liquid with said gas, said second duct beyond said relief valve terminating in a first nozzle opening near the outlet of said first liquid supply duct so as to create a flow of small gas bubbles in the flow of said carrier liquid to be treated prior to entering said flotation space, at least a part of said bubbles adhering to particles suspended in said carrier liquid to be treated for making these particles flotatable; the improvement comprising at least one additional nozzle opening into said first supply duct upstream of said first nozzle for producing gas bubbles in said carrier liquid upstream of said first nozzle, said additional nozzle being connected to said second supply duct by means including an adjustable relief valve which is set so that the carrier liquid to be treated is saturated with the gas before reaching the point in said first duct where said first nozzle opens into said first duct.

2. The system of claim 1 wherein the improvement further comprises means for adding a flotation-promoting substance to said first liquid supply duct, said means being associated with said one additional nozzle so as to disperse said additional substance into said carrier liquid upstream of said first nozzle by means of the gas bubbles generated by said additional nozzle.

3. The system of claim 2 wherein the improvement further comprises a constriction in the first supply duct for the carrier liquid to be treated, the additional nozzle associated with the means for adding a flotation-promoting substance opening into said duct upstream of said constriction and being directed towards said constriction.

* * * * *